A. C. DANVER.
BALL SOCKET.
APPLICATION FILED MAY 11, 1914.

1,116,571. Patented Nov. 10, 1914.

WITNESSES:
C. T. Hannigan
Edith M. Bromley

INVENTOR.
Andrew C. Danver
By James L. Jenks
Attorney.

UNITED STATES PATENT OFFICE.

ANDREW C. DANVER, OF PAWTUCKET, RHODE ISLAND.

BALL-SOCKET.

1,116,571.  Specification of Letters Patent.  Patented Nov. 10, 1914.

Application filed May 11, 1914.  Serial No. 837,632.

*To all whom it may concern:*

Be it known that I, ANDREW C. DANVER, a citizen of the United States, residing at Pawtucket, in the county of Providence and State of Rhode Island, have invented certain new and useful Improvements in Ball-Sockets, of which the following is a specification.

My invention relates to improvements in ball sockets, and the purpose of my invention is to provide a ball socket that will at all times keep the contained ball under tension and free from rattle, and will also provide a means for keeping the ball properly lubricated.

I accomplish these objects by the device shown in the accompanying drawing, in which—

Figure 1:
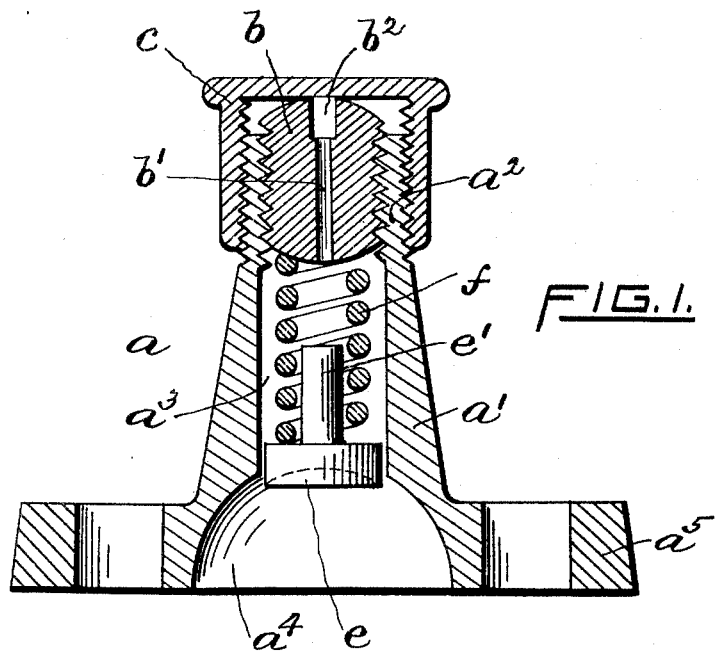
Figure 2:
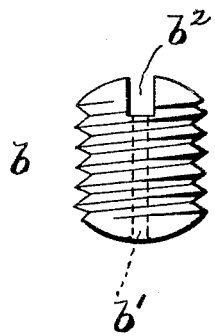

Figure 1 is a vertical section of my device, and Fig. 2 a view of a perforated screw plug, the function of which will be hereinafter shown.

The same parts are indicated by the same letters throughout the various views.

In Fig. 1, $a$ is a vertical section of my device which comprises a tubular cylindrical body $a'$ flanged at the lower portion thereof, as shown at $a^5$, and having at the lower end thereof the spherical concavity $a^4$ for the accommodation of a ball. $a^3$ represents the inner tubular portion of the device and $e$—$e'$ a bearing member which is in contact with the contained ball when the device is in use. The lower flanged end $e$ of this bearing member has a spherical concavity of the same curvature as the ball upon which it is intended to fit. $f$ in Fig. 1 is a spiral spring bearing upon the flanged head $e$ of the bearing member and kept in compression at the upper end by the screw plug $b$ which is threaded into the interior of the upper extremity of $a$. The exterior of $a$ at the upper end is also threaded and fitted with a cap $c$ constituting a grease cup, $a^2$ being the wall of the upper portion of the device between the interior and exterior threads. The screw plug $b$ is provided with a longitudinal perforation $b'$ and at its upper extremity, nearest the grease cup $c$, is provided with a slot $b^2$ for the admission of a screw-driver.

When my device is in position, the ball to be held occupies the depression $a^4$ and the bearing member $e$—$e'$ is held firmly against the ball by means of the spiral spring $f$ and the plug $b$, any desired degree of compression being obtained by means of $b$ and $f$. The grease cup $c$ is filled with suitable lubricant and is screwed down upon $a$ in the manner of an ordinary grease cup. By means of the perforation $b'$ in the screw plug $b$, the lubricant is forced through $b'$ and into the tubular cavity $a^3$. The flanged head $e$ of the bearing member is of such a size as to leave a space between its outside surface and the interior of the tubular cavity $a^3$, so that the lubricant by the screwing down of the cap $c$ is forced into and upon the ball held in the socket $a^4$, thus keeping the bearing surfaces $a^4$ and $e$ and the ball always properly lubricated. It is evident that instead of the single perforation $b'$ in the screw plug $b$, other perforations may be made, or longitudinal recesses may be made, in the external surface without departing from the principle of my invention, which is the providing of a screw plug having a passage or passages therein for the transmission of a lubricant contained in the grease cup.

I am aware that prior to my invention ball sockets have been made comprising a cylindrical tubular body, a bearing member, a spiral spring, and means for adjusting the tension between the bearing member and the ball held by it, but I am not aware that there has been any provision made for the lubrication of the ball by means of a grease cup integral with said tubular body and a perforated screw plug permitting the lubricant to reach the ball.

Having now described my invention, what I claim and desire to secure by Letters Patent is:—

1. In a tubular ball socket adapted to receive a ball at one end thereof and having a grease cup at the other end, a screw plug situated intermediate said grease cup and the ball end of the socket, said screw plug being provided with a passage to permit the transmission of lubricant from the grease cup to the ball end of the socket in combination with said grease cup and said socket member, substantially as described.

2. In a ball socket the combination of a tubular cylindrical body adapted to receive a ball at one end thereof, with a grease cup, a bearing member, a screw plug having a passage to permit the transmission of lubricant from said grease cup to the contained ball, and a spiral spring between said screw plug and said bearing member, said spring, plug, and bearing member operating to regulate the tension between said socket and the contained ball, substantially as set forth.

In testimony whereof I affix my signature in presence of two witnesses.

ANDREW C. DANVER.

Witnesses:
 THOMAS P. CORCORAN,
 EDITH M. BROMLEY.

Copies of this patent may be obtained for five cents each, by addressing the " Commissioner of Patents, Washington, D. C."